US010245607B2

(12) United States Patent
McMichael et al.

(10) Patent No.: US 10,245,607 B2
(45) Date of Patent: Apr. 2, 2019

(54) METHOD AND APPARATUS FOR DISPENSING FLUID (71) Applicant: GRACO MINNESOTA INC., Minneapolis, MN (US)

(72) Inventors: Jonathan R. McMichael, Canton, OH (US); Thomas V. Vo, Bedford, OH (US)

(73) Assignee: Graco Minnesota Inc., Minneapolis, MN (US)

(*) Notice: Subject to any disclaimer, the term of this patent is extended or adjusted under 35 U.S.C. 154(b) by 0 days.

(21) Appl. No.: 15/113,979

(22) PCT Filed: Mar. 19, 2015

(86) PCT No.: PCT/US2015/021400
§ 371 (c)(1),
(2) Date: Jul. 25, 2016

(87) PCT Pub. No.: WO2015/143118
PCT Pub. Date: Sep. 24, 2015

(65) Prior Publication Data
US 2016/0346800 A1    Dec. 1, 2016

Related U.S. Application Data (60) Provisional application No. 61/955,671, filed on Mar. 19, 2014.

(51) Int. Cl.
*B05B 12/00* (2018.01)
*B05B 1/32* (2006.01)
(Continued)

(52) U.S. Cl.
CPC .............. *B05B 12/008* (2013.01); *B05B 1/32* (2013.01); *B05B 7/24* (2013.01); *B05B 12/006* (2013.01);
(Continued)

(58) Field of Classification Search
CPC . B05B 12/008; B05B 12/006; B05B 12/1436; B05B 1/32; G05D 7/0688
See application file for complete search history.

(56) References Cited

U.S. PATENT DOCUMENTS

| 4,934,565 A | 6/1990 | Heisey et al. |
| 5,056,462 A | 10/1991 | Perkins et al. |

(Continued)

FOREIGN PATENT DOCUMENTS

| JP | H07218489 A | 8/1995 |
| JP | 2005030559 A | 2/2005 |

(Continued)

OTHER PUBLICATIONS

Written Opinion and International Search Report, for PCT No. PCT/US2015/021400, dated Jun. 25, 2015, 13 pages.
(Continued)

*Primary Examiner* — Donnell Long
(74) *Attorney, Agent, or Firm* — Kinney & Lange, P.A.

(57) ABSTRACT

A fluid dispensing system includes a pump, a valve, and a dispenser disposed downstream of the valve and connected to the valve with a hose. To provide a steady flow rate at the dispenser, the pump charges the fluid to or above the pressure required to achieve a desired flow rate. The valve cycles between open and closed at a fixed frequency. The valve-open time is varied within that frequency to maintain the desired flow rate.

19 Claims, 7 Drawing Sheets (51) Int. Cl.
  *B05B 12/08* (2006.01)
  *B05B 12/14* (2006.01)
  *F16K 1/00* (2006.01)
  *G05D 7/06* (2006.01)
  *B05B 7/24* (2006.01)

(52) U.S. Cl.
  CPC ........ *B05B 12/087* (2013.01); *B05B 12/1436* (2013.01); *F16K 1/00* (2013.01); *G05D 7/0688* (2013.01)

(56) References Cited

U.S. PATENT DOCUMENTS

| | | | |
|---|---|---|---|
| 5,134,961 | A | 8/1992 | Giles et al. |
| 5,419,930 | A | 5/1995 | Schucker |
| 5,480,597 | A * | 1/1996 | Ishida ................ B01F 15/0429 261/DIG. 26 |
| 5,510,149 | A | 4/1996 | Schucker |
| 5,741,558 | A | 4/1998 | Otani et al. |
| RE36,534 | E | 1/2000 | Schucker |
| 6,132,511 | A | 10/2000 | Crum et al. |
| 6,296,708 | B1 | 10/2001 | Coulibaly et al. |
| 6,527,862 | B2 | 3/2003 | McLoughlin et al. |
| 6,547,884 | B1 | 4/2003 | Crum et al. |
| 7,024,285 | B2 * | 4/2006 | Saelens ................ B05B 12/085 239/69 |
| 2002/0020714 | A1 * | 2/2002 | Pozniak ............... B01F 13/1055 222/129 |
| 2002/0029740 | A1 | 3/2002 | McLoughlin et al. |
| 2002/0071916 | A1 * | 6/2002 | Rawlings ............... B05B 1/3013 427/8 |
| 2002/0088397 | A1 | 7/2002 | Perkins et al. |
| 2005/0056713 | A1 * | 3/2005 | Tisone ............... B01D 19/0047 239/690 |
| 2008/0011877 | A1 * | 1/2008 | Hibbard ................ B05B 7/2489 239/146 |
| 2009/0194604 | A1 * | 8/2009 | Smith .................... B05B 1/304 239/1 |
| 2014/0239521 | A1 * | 8/2014 | Ergican ................ B67D 1/0058 261/115 |
| 2014/0277780 | A1 * | 9/2014 | Jensen .................. B05B 12/004 700/283 |

FOREIGN PATENT DOCUMENTS

| | | |
|---|---|---|
| JP | 2012251850 A | 12/2012 |
| KR | 101083264 B1 | 11/2011 |
| WO | WO00/23704 A1 | 9/1999 |
| WO | WO 9943606 A1 | 9/1999 |

OTHER PUBLICATIONS

Extended European Search Report for EP Application No. 15765910.3, dated Oct. 13, 2017, 7 pages.

* cited by examiner

METHOD AND APPARATUS FOR DISPENSING FLUID

CROSS-REFERENCE TO RELATED APPLICATIONS

This application claims priority to U.S. Provisional Application No. 61/955,671 filed Mar. 19, 2014, and entitled "DIGITAL PRESSURE REGULATOR," the disclosure of which is hereby incorporated in its entirety.

BACKGROUND

This disclosure relates generally to applicator systems that are used to spray fluids, such as paint, sealants, coatings, and the like. More particularly, the disclosure relates to a fluid pressure and fluid flow regulator for the valves of a spray system.

Applicator systems are utilized to apply fluids to a surface, or to combine a fluid with one or more other fluids prior to application to the surface. In a plural-component system, the flow rates of the fluids are controlled to maintain a desired ratio between the multiple fluids as the fluids are applied to the surface. In a single-component system, the flow rate of the fluid is controlled to ensure satisfactory application of the fluid to the surface.

To maintain the desired flow rate, a pump drives the fluid downstream through a valve to a dispenser. The pump drives the fluid at a set pressure, and the valve is opened a set time, such that the valve restricts the volume of fluid that can flow through the valve over any given period of time. In this way, the pressure generated by the pump and the time that the valve is opened determine the flow rate of the fluid. The valve remains opened at a controlled amount to maintain the constant flow rate through the system.

SUMMARY

According to one embodiment of the present invention, a method of dispensing fluid includes charging the fluid to a pressure with a prime mover, cycling a downstream valve open and closed at a fixed frequency, and varying a valve-open time to maintain a desired flow rate at a downstream dispenser.

According to another embodiment of the present invention, a fluid dispensing system includes a prime mover for driving a fluid downstream, a valve disposed downstream of the prime mover, a dispenser disposed downstream of the valve with a hose fluidly connecting the dispenser to the valve, and a controller communicating with the prime mover and the valve. The prime mover includes a motor and a pump. The valve is configured to cycle between fully open and fully closed according to a variable duty-cycle. The controller directs the prime mover to charge the fluid to a pressure, the controller then controls the duty-cycle of the valve to maintain a desired flow rate of the fluid at the dispenser.

DETAILED DESCRIPTION

Figure 1:
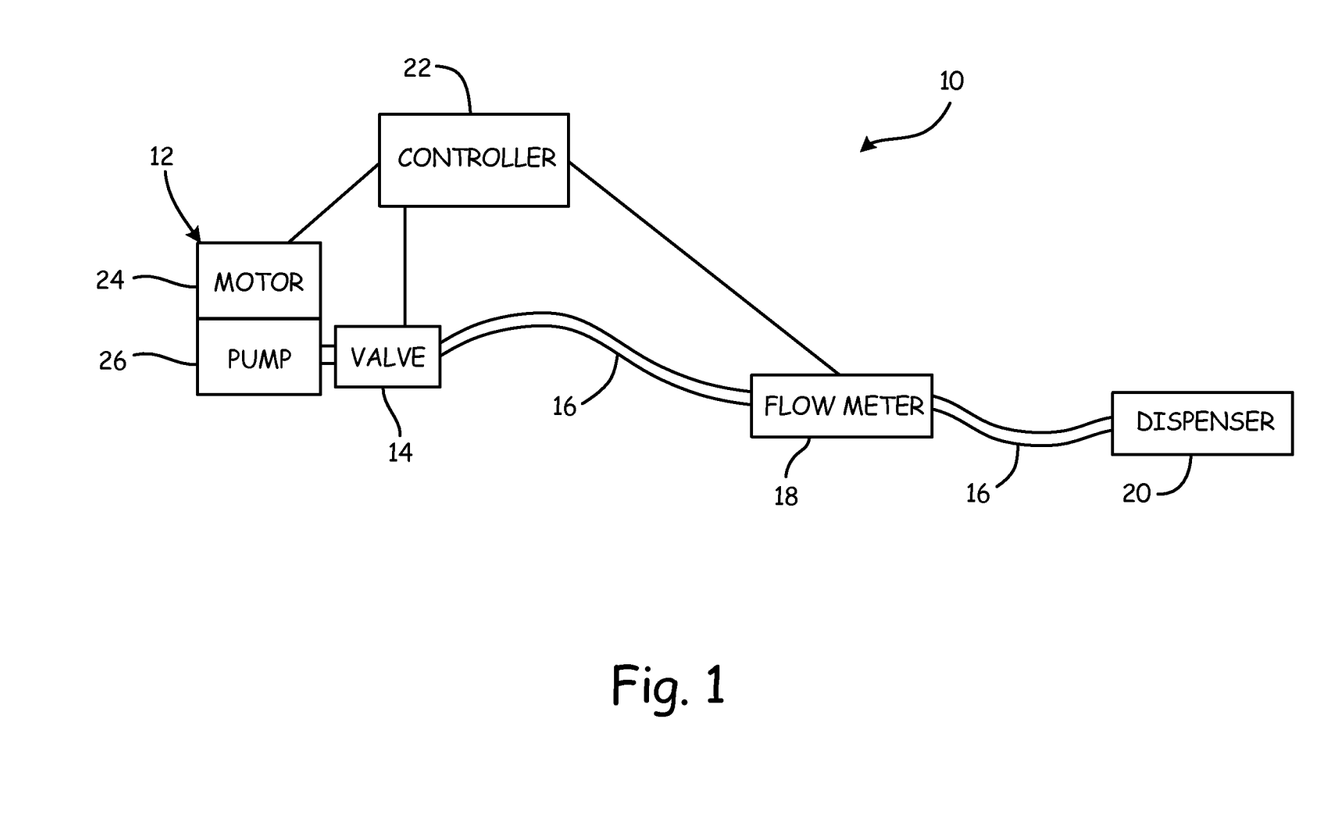
FIG. 1 is a schematic view of a fluid pumping system.

FIG. 1 is a schematic view of fluid pumping system 10. Fluid pumping system 10 includes prime mover 12, valve 14, hose 16, flow meter 18, dispenser 20, and controller 22. Prime mover 12 includes motor 24 and pump 26.

Motor 24 is attached to and drives pump 26. Valve 14 is disposed downstream of prime mover 12. While valve 14 is shown as directly mounted to prime mover 12, it is understood that valve 14 may be connected to prime mover 12 in any suitable manner that fluid is driven through valve 14 by prime mover 12. Hose 16 fluidly connects valve 14 to dispenser 20. Flow meter 18 is located downstream of valve 14 and upstream of dispenser 20.

Controller 22 is in communication with prime mover 12, valve 14, and flow meter 18. Controller 22 receives flow information from flow meter 18 and can adjust the flow rate generated by prime mover 12 and the valve-open time of valve 14. Valve 14 may include an actuator to drive valve 14 between open and closed, and it is understood that controller 22 may communicate with the actuator, with valve 14, or with both. Additionally, while controller 22 is shown as communicating through a wired connection, it is understood that controller 22 may communicate in any suitable way, such as wirelessly.

Motor 24 drives pump 26, and pump 26 drives the fluid downstream to dispenser 20 through hose 16. After exiting dispenser 20, the fluid may be applied directly to a surface or may be combined with another material for application to a surface. As such, it is understood that fluid pumping system 10 may be utilized in a single-component dispensing system or a plural-component dispensing system. Flow meter 18 detects a flow rate of the fluid at a set distance from dispenser 20. Flow meter 18 may detect a pressure of the fluid in hose 16 as the fluid may have a flow rate of zero when dispenser 20 is closed. Flow meter 18 communicates the flow and pressure data to controller 22, and controller 22 can then adjust the rate of flow by controlling the flow rate generated by prime mover 12 and the valve-open time of valve 14 to provide a desired discharge flow rate at dispenser 20. Fluid pumping system 10 is shown as a single-component pumping system, where the fluid is applied directly to a surface from dispenser 20. While fluid pumping system 10 is shown as a single-component system, it is understood that fluid pumping system 10 can be a plural-component pumping system where the fluid pumping is mixed with another material downstream of dispenser 20 prior to application to a surface.

To achieve the desired flow rate, prime mover 12 builds a pressure of the fluid to a first pressure. Prime mover 12 preferably builds the pressure to the first pressure by allowing the fluid to deadhead against valve 14. It is understood that the pressure can be built to the first pressure in any suitable manner, such as by leaving valve 14 in a closed position while the fluid deadheads against the valve 14 or opening valve 14 such that the fluid deadheads against dispenser 20. To ensure that the pressure generated by prime mover 12 does not exceed the capacity of either motor 16 or pump 18, an accumulator (not shown) may be included to allow for storage of the fluid once the pressure builds above a predetermined level.

Once the pressure reaches the first pressure, valve 14 begins to cycle open and closed at a desired frequency. It is understood that the user may select any suitable frequency depending on the nature of fluid pumping system 10. A higher frequency allows for more responsive control, and thus less dampening components, such as hose 16, are required in the fluid stream. It is understood that lower frequencies may also be used to achieve steady flow at dispenser 20, and that more and larger dampening components, such as hose 16 and an accumulator, may facilitate such flow. Cycling valve 14 causes the fluid pressure to temporarily drop as the fluid fills hose 16 and flows to dispenser 20. Valve 14 preferably cycles at 50 percent duty-cycle while a system pressure builds to a level suitable to dispense the fluid at the desired flow rate. A 50 percent duty-cycle is a cycle where valve 14 is open for half of the cycle and closed for half of the cycle. For example, where the fixed frequency is 2 Hz, valve 14 would be open for 0.25 seconds and closed for 0.25 seconds. Valve 14 continues to cycle according to the 50 percent duty-cycle while the pressure builds downstream of valve 14. While valve 14 has been described as cycling according to a fixed frequency, it is understood that the frequency may vary during fluid application. For example, where the user desires a variable flow rate, the frequency at which valve 14 cycles may similarly vary with the flow rate. To reduce wear on the valve and energy consumption, valve 14 may cycle at a higher frequency when larger flow rates are desired, and valve 14 may cycle at a lower frequency when smaller flow rates are desired. It is thus also understood that controller 22 may communicate with valve 14 to control the valve frequency in addition to the valve-open time.

Flow meter 18 detects the flow rate of the fluid through hose 16 and provides that data to controller 22. While flow meter 18 is described as sensing the rate of flow through hose 16, it is understood that flow meter 18 may also sense the fluid pressure or differential pressure in hose 16 and communicate that information to controller 22. Prime mover 12 continues to build pressure within fluid pumping system 10 until the pressure has reached a level required to achieve the desired flow rate at dispenser 20. Once flow meter 18 senses that the flow rate has reached the desired level, controller 22 begins to control valve 14. Controller 22 ensures a constant downstream flow rate at dispenser 20 by adjusting the valve-open time of the valve 14. While valve 14 continues to cycle at the frequency, the valve-open time within each open-closed cycle is varied to control the flow rate though valve 14. For example, if flow meter 18 senses that the flow rate through dispenser 20 is too low, then controller 22 will increase the valve-open time, such that valve 14 will remain open for more than half of the frequency. Pump 26 provides fluid to valve 14 at a constant pressure, and as such increasing the valve-open time raises the pressure in hose 16, and hence the flow rate at dispenser 20. Valve 14 can thus be said to operate on a variable duty-cycle, where the valve-open time can vary between zero percent and 100 percent of the valve cycle. Similarly, where flow meter 18 senses that the flow rate to dispenser 20 is too high, then controller 22 will decrease the valve-open time to reduce the volume of fluid through valve 14, which correspondingly decreases the flow rate at dispenser 20.

Adjusting the valve-open time allows controller 22 to provide fine adjustments to the flow rate at dispenser 20. The valve-open time may be adjusted anywhere between zero percent and 100 percent of the valve cycle. The range of the valve-open time is dependent upon the precision with which valve 14 can actuate and the frequency at which valve 14 is cycling. For example, where valve 14 can cycle between open and closed with 0.001 seconds of precision, the valve-open time can be controlled between 0.1 percent and 100 percent, in steps of 0.1 percent, where valve 14 cycles at a frequency of 1 Hz. Where valve 14 can cycle open and closed with 0.001 seconds of precision, the valve-open time can be controlled between 1.0 percent and 100 percent, in steps of 1.0 percent, where valve 14 cycles at a frequency of 10 Hz.

To maintain the valve-open time between zero percent and 100 percent, controller 22 can adjust the fluid pressure generated by prime mover 12. For example, controller 22 can adjust prime mover 12 to drive the fluid at a lower pressure as the valve-open time approaches zero percent of the duty-cycle, and the valve-open time would correspondingly be increased to maintain the flow rate at dispenser 20. Similarly, controller 22 can increase the pressure generated by prime mover 12 as the valve-open time approaches 100 percent of the duty-cycle, and controller 22 would correspondingly decrease the valve-open time to maintain the flow rate at dispenser 20. Therefore, controller 22 can control both prime mover 12 and valve 14 to maintain a desired flow rate at dispenser 20.

Figure 2:
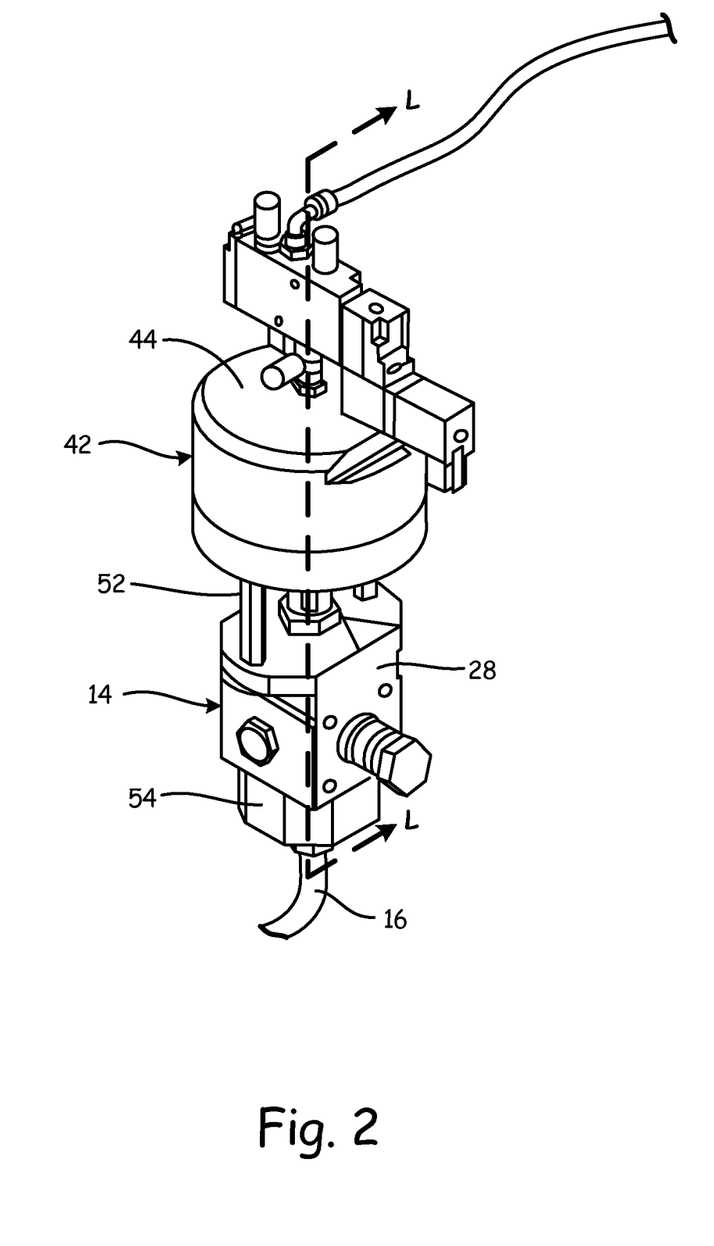
FIG. 2 is a perspective view of a fluid regulator for a fluid pumping system.
Figure 2A:
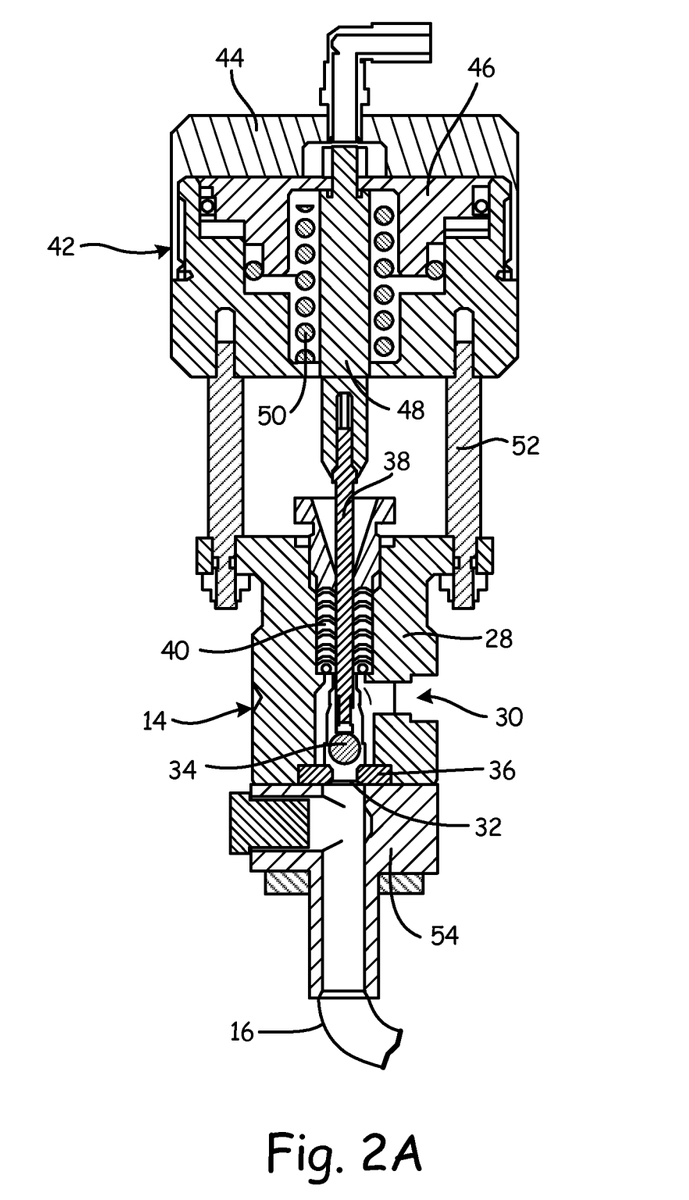
FIG. 2A is a cross-sectional view of the fluid regulator taken along line L-L in FIG. 2 with a valve in an open position.
Figure 2B:
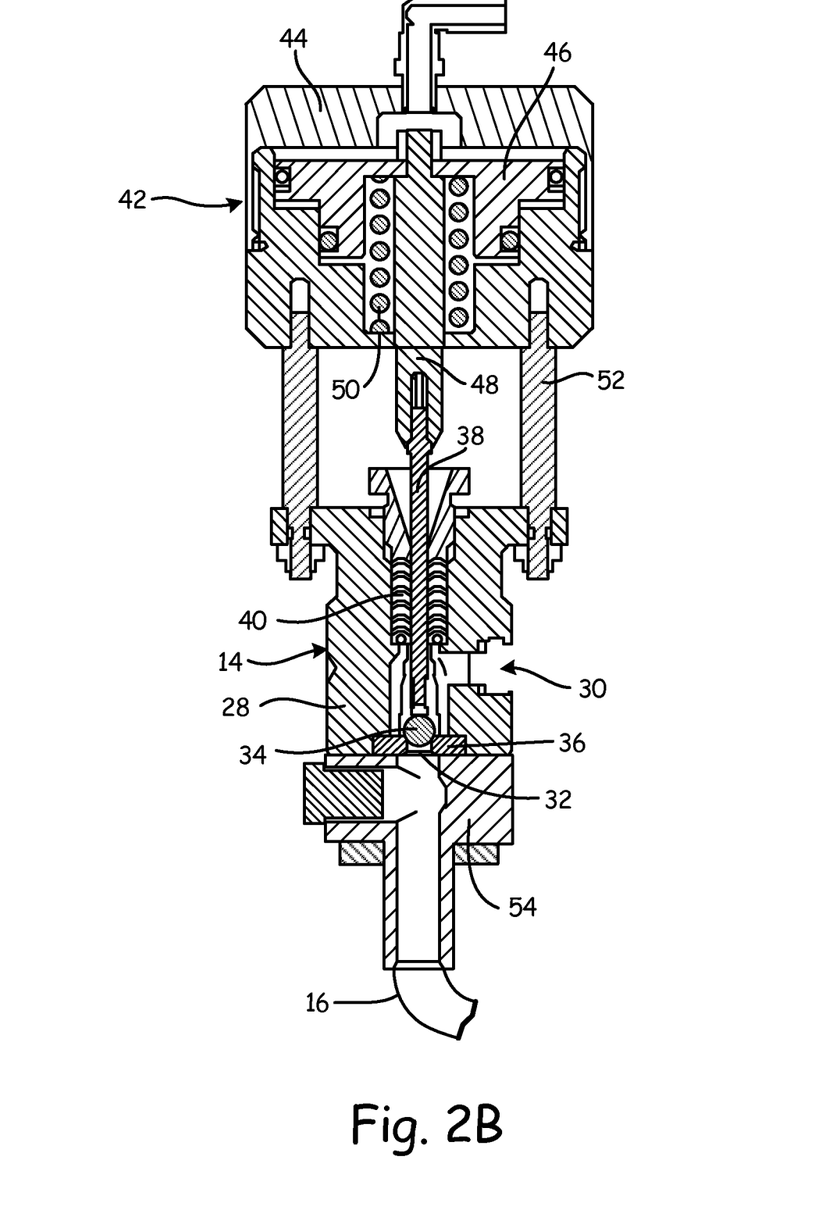
FIG. 2B is a cross-sectional view of the fluid regulator taken along line L-L in FIG. 2 with the valve in a closed position.

FIG. 2 is a perspective view of valve 14. FIG. 2A is a cross-sectional view of valve 14 taken along line L-L in FIG. 2, with valve 14 fully open. FIG. 2B is a cross-sectional view of valve 14 taken along line L-L in FIG. 2, with valve 14 fully closed. FIGS. 2A and 2B will be discussed together. Valve 14 includes valve housing 28, fluid inlet 30, fluid outlet 32, ball 34, seat 36, valve shaft 38, and valve seals 40. Actuator 42 includes actuator housing 44, piston 46, piston rod 48, and spring 50.

Actuator 42 is mounted to valve 14 by mounting rods 52 extending between and connecting actuator housing 44 and valve housing 28. Ball 34 is mated to a distal end of valve shaft 38. Seat 36 is secured between valve housing 28 and outlet manifold 54. Valve shaft 38 extends through valve housing 28 and is connected to piston rod 48, such that piston rod 48 drives valve shaft 38. Valve seal 40 surrounds valve shaft 38 and provides a seal around valve shaft 38. Piston rod 48 extends through actuator housing 44 and is connected to piston 46. Piston 46 is slidably positioned within actuator housing 44. Spring 50 is disposed within actuator housing 44 and around piston rod 48.

Air is provided to actuator housing 44 to drive piston 46 and actuate valve 14 between open and closed. It is to be understood that while actuator 42 is shown as a pneumatic actuator, and thus valve 14 is a pneumatically actuated valve, valve 14 may be actuated in any suitable manner such that valve provides a steady flow of fluid to dispenser 20. For example, valve 14 may be actuated pneumatically, electrically, or hydraulically. The frequency at which valve 14 cycles is dependent upon the physical configuration of fluid pumping system 10, as such an example valve could operate at a frequency from about 0.5 Hz to greater than 1,000 Hz.

As shown in FIG. 2A, piston 46 is in an open position, with ball 34 disengaged from seat 36, when in valve 14 is in a resting position. Air is provided to actuator housing 48 and piston 46 is driven downwards, causing ball 34 to engage seat 36 and thereby form a seal to prevent the fluid from flowing through valve 14. Preventing fluid from flowing through valve 14 allows prime mover 12 to build the fluid pressure to a suitable level to provide the fluid to dispenser 20 (shown in FIG. 1) at a desired flow rate. After the fluid pressure builds to a suitable level valve 14 begins cycling at the desired frequency. The maximum frequency at which valve 14 can operate is limited by the physical nature of valve 14.

Valve 14 is cycled from closed to open by exhausting air from actuator housing 48, spring 50 then pushes piston 46 from the position shown in FIG. 2B to the position shown in FIG. 2A, disengaging ball 34 from seat 36. Disengaging ball 34 from seat 36 opens valve 14 and allows fluid to flow through valve 14. This allows the fluid to flow downstream through valve 14, hose 16, and dispenser 20 (shown in FIG. 1). While valve 14 is shown as including ball 34 and seat 36, one of skill in the art will appreciate that valve 14 may include any suitable type of valve, such as a globe valve or a gate valve, that can be actuated between fully open and fully closed at the desired frequency.

As previously discussed, prime mover 12 charges the fluid to an initial pressure. With valve 14 in the closed position, the fluid deadheads against the ball 34 and seat 36 and the pressure builds upstream of valve 14. After the pressure reaches a predetermined level air is exhausted from actuator housing 44, and air is switched to drive from the bottom side of piston 46, thus driving piston 46 upward to open valve 14. Spring 50 assists the air in driving piston 46 upward to open valve. Valve 14 cycles according to a set duty-cycle as the pressure builds downstream of valve 14 and through fluid pumping system 10. While the pressure builds downstream of valve 14, valve 14 remains open for half of each cycle and closed for half of each cycle, thus valve 14 operates on a 50 percent duty-cycle. For example, where valve 14 cycles at a frequency of 2 Hz, valve 14 would remain open for 0.25 seconds and closed for 0.25 seconds as the downstream pressure builds. Once the downstream pressure has built to a level that provides the fluid to dispenser 20 at the desired flow rate, prime mover 12 continues to drive the fluid at a constant rate and valve continues to cycle at the frequency.

Controller 22 can alter the valve-open time by controlling the air provided to piston 46, to maintain the downstream flow rate at dispenser 20. As such, where flow meter 18 (shown in FIG. 1) senses that the flow rate in hose 16 is below that required to dispense the fluid at the desired flow rate, controller 22 can increase the valve-open time to allow a greater volume of fluid through valve 14, while valve 14 continues to cycle at the same frequency. Because valve 14 cycles at the same frequency and prime mover 12 continues to drive the fluid downstream at the same pressure, increasing the valve-open time increases the flow rate at dispenser 20 as a greater volume of fluid will flow through valve 14 within the same period of time. For example, where valve 14 operates at a frequency of 2 Hz, valve 14 will have an initial valve-open time of 0.25 seconds, while the full valve-cycle will take 0.5 seconds. Increasing the valve-open time to 0.4 seconds allows a greater volume of fluid to flow through valve 14 within that same 0.5 second cycle. Similarly, where flow meter 18 senses that the flow rate through hose 16 is greater than that required to dispense fluid at the desired flow rate, controller 22 decreases the valve-open time to allow a smaller volume of fluid through valve 14, thus decreasing the flow rate at dispenser 20.

Figure 3:
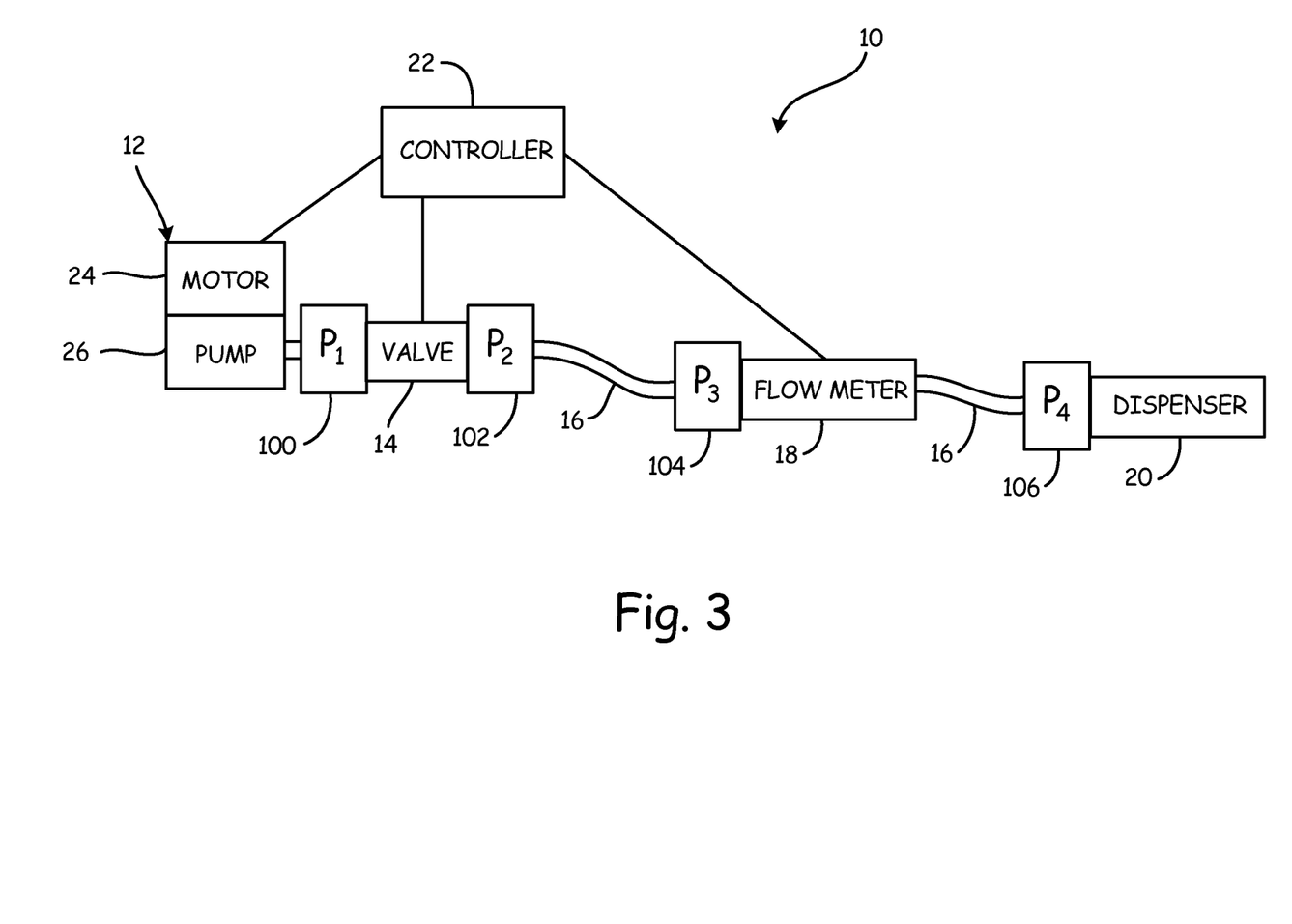
FIG. 3 is a schematic view of a fluid pumping system including pressure sensors.
Figure 3A:
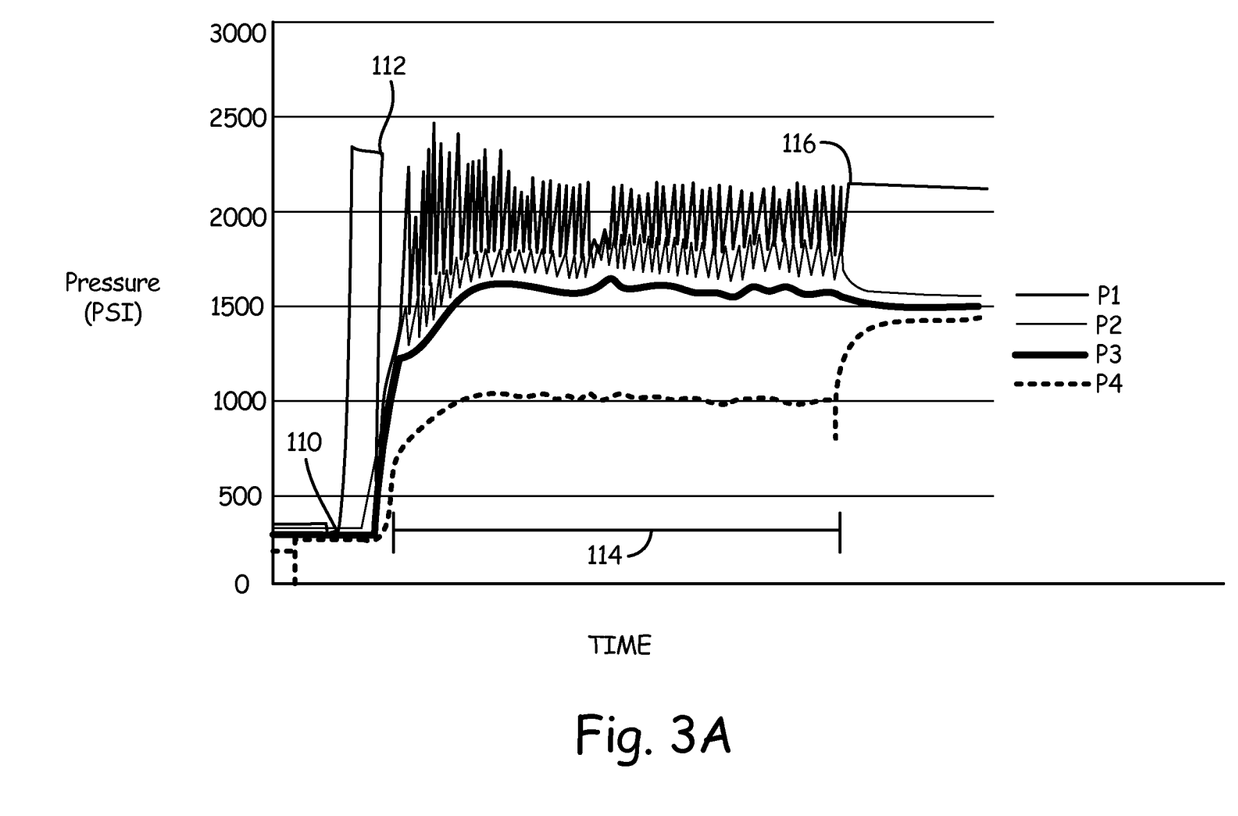
FIG. 3A is a graph showing various pressures taken at the pressure sensors in FIG. 4.

FIG. 3 is a schematic view of fluid dispensing system 10 with first pressure sensor 100, second pressure sensor 102, third pressure sensor 104, and fourth pressure sensor 106. FIG. 3A is a graph showing first pressure P1, second pressure P2, third pressure P3, and fourth pressure P4 that are measured at pressure sensors 100, 102, 104, 106, with valve 14 cycling at a frequency of 2 Hz, with first pressure sensor 100, second pressure sensor 102, third pressure sensor 104, and fourth pressure sensor 106 collecting pressure data at a frequency of about 400 Hz. FIGS. 3 and 3A will be discussed together. Fluid pumping system 10 includes prime mover 12, valve 14, hose 16, flow meter 18, and dispenser 20. Prime mover 12 includes motor 22 and pump 24.

Motor 24 is attached to and drives pump 26. Valve 14 is disposed downstream of prime mover 12. Hose 16 fluidly connects valve 14 to dispenser 20. Flow meter 18 is located on hose 16 downstream of valve 14. Controller 22 communicates with prime mover 12, valve 14, and flow meter 18. One of skill in the art will understand that controller 22 may communicate with an actuator or some other device to control valve 14. Flow meter 18 senses a flow rate, a pressure, a differential pressure, or any combination thereof of the fluid passing through hose 16 and communicates that data to controller 22. Controller 22 adjusts the pressure generated by prime mover 12 and the valve-open time of valve 14 to provide a desired flow rate at dispenser 20.

As shown, first pressure P1 is the pressure of the fluid between prime mover 12 and valve 14, and first pressure P1 is sensed by first pressure sensor 100. Second pressure P2 is a pressure of the fluid downstream of valve 14 sensed by second pressure sensor 102. Third pressure P3 is a pressure of the fluid at flow meter 18 sensed by third pressure sensor 104. It is understood that flow meter 18 can also sense the pressure of the fluid or a differential pressure, and that flowmeter 18 communicates that pressure to controller 22. Fourth pressure P4 is a pressure of the fluid at dispenser 20 sensed by fourth pressure sensor 106, and is the pressure at which the fluid is dispensed.

Referring specifically to FIG. 3A, first pressure P1, second pressure P2, third pressure P3, and fourth pressure P4 are shown as fluid is dispensed through dispenser 20. As shown, fluid pumping system 10 is set to dispense fluid through dispenser 20 at about 1000 psi, and valve 14 operates at a frequency of 2 Hz. Prime mover 12 is activated at point 110 and continues to build pressure against the closed valve 14 until controller 22 signals valve 14 to begin cycling between open and closed. Valve 14 begins cycling at point 112. After valve 14 begins to cycle, fluid flows through hose 16 and to dispenser 20. Dispenser 20 may be opened for a brief period to allow the fluid to fill hose 16, then closed to allow the pressure within fluid pumping system 10 to build to the level required to dispense the fluid at the desired flow rate. Opening valve 14 allows the fluid to flow downstream and causes an initial drop in first pressure P1, after which first pressure P1, second pressure P2, third pressure P3, and fourth pressure P4 begin to climb to a steady-state, shown in range 114.

While in the steady-state, fluid pumping system 10 dispenses fluid at about 1000 psi. Flow meter 18 senses the fluid flow rate associated with third pressure P3 and communicates the data to controller 22. Based on that data, controller 22 can then adjust the valve-open time to maintain a consistent flow rate at dispenser 20. While swings in the fluid pressure are experienced closer to prime mover 12 and valve 14, due to valve 14 cycling between open and closed, nearly no variation in fluid pressure is experienced at dispenser 20. The higher the frequency that valve 14 cycles at, the less variation in fluid pressure will be experienced closer to valve 14. After the fluid has been dispensed, dispenser 20 is closed at point 116 and first pressure P1, second pressure P2, third pressure P3, and fourth pressure P4 remain steady as the fluid deadheads against the closed dispenser 20.

Figure 4:
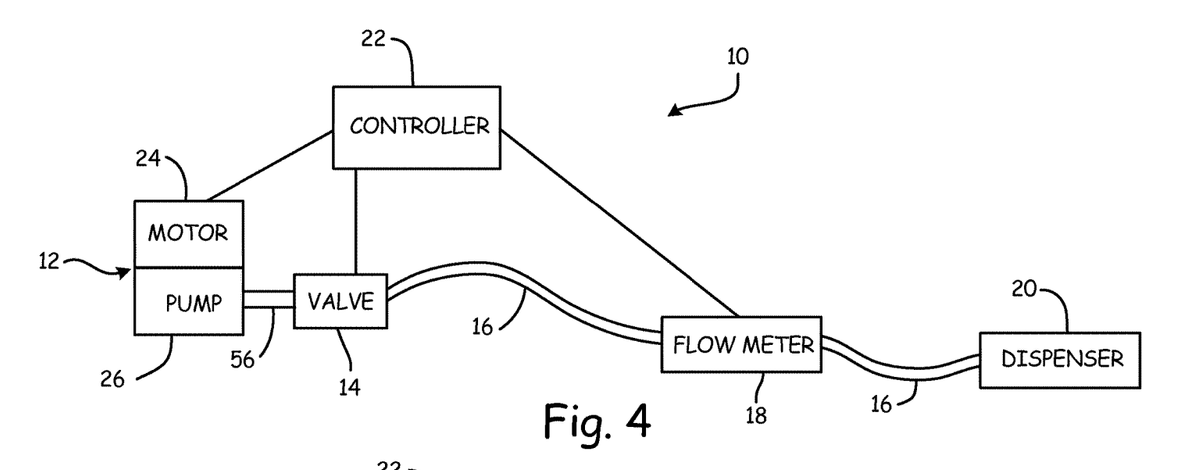
FIG. 4 is a schematic view of a fluid pumping system with a restrictive hose.

FIG. 4 is a schematic view of fluid pumping system 10 with restrictive hose 56. Fluid pumping system 10 includes prime mover 12, valve 14, hose 16, flow meter 18, and dispenser 20. Prime mover 12 includes motor 22 and pump 24.

Motor 24 is attached to and drives pump 26. Valve 14 is disposed downstream of prime mover 12. Restrictive hose 56 is disposed between and fluidly connects prime mover 12 and valve 14. Hose 16 fluidly connects valve 14 to dispenser 20. Flow meter 18 is located on hose 16 between valve 14 and dispenser 20.

Controller 22 communicates with prime mover 12, valve 14, and flow meter 18. Controller 22 controls the fluid pressure generated by prime mover 12 and the valve-open time of valve 14. Motor 22 drives pump 24 to move the fluid downstream through restrictive hose 56, valve 14, hose 16, and dispenser 20. Flow meter 18 reads the flow rate of the fluid between valve 14 and dispenser 20 and communicates that information to controller 22. Restrictive hose 56 limits the volume of fluid that can flow through valve 14 when valve 14 is opened. It is to be understood that restrictive hose 56 may be substituted with another restrictive hose having a different diameter to allow fluid pumping system 10 to discharge the fluid across a range of pressures and flow rates.

Restrictive hose 56 limits the volume of the fluid that can enter valve 14 from prime mover 12. As restrictive hose 56 limits the maximum volume of fluid that enters valve 14. In this way, restrictive hose 56 allows prime mover 12 to be set to provide fluid at a constant pressure, and the flow rate of the fluid may be controlled via the valve-open time. The flow rate provided to dispenser 20 is controlled by altering the valve-open time. Restrictive hose 56 also allows valve 14 to operate at a lower frequency while still providing fluid to dispenser 20 at a steady flow rate because restrictive hose 56 limits the volume of fluid that may flow through valve 14 the moment valve 14 is opened.

Figure 5:
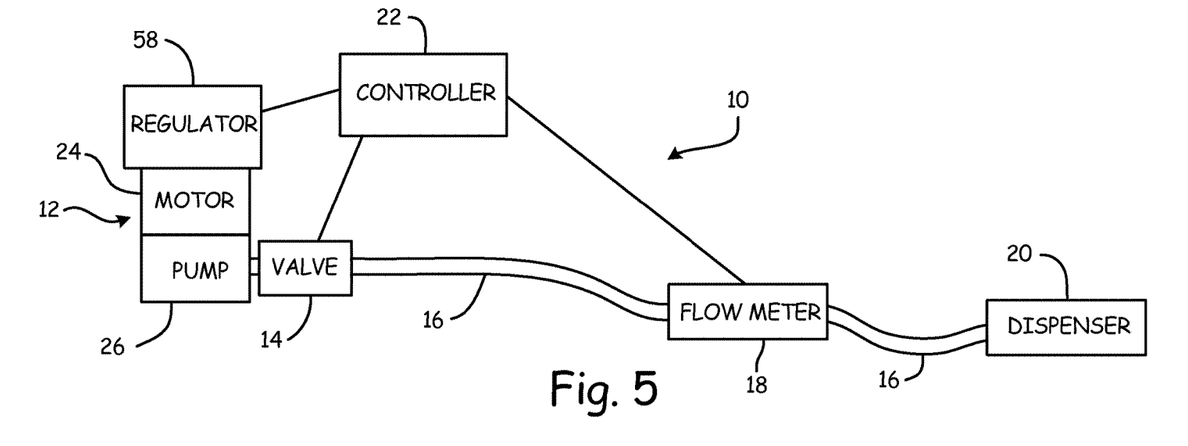
FIG. 5 is a schematic view of a fluid pumping system with a voltage-to-pressure regulator.

FIG. 5 is a schematic view of fluid pumping system 10 with a voltage to pneumatic regulator 58. Fluid pumping system 10 includes prime mover 12, valve 14, hose 16, flow meter 18, and dispenser 20. Prime mover 12 includes motor 24 and pump 26.

Motor 24 is attached to and drives pump 26. Regulator 58 is mounted to prime mover 12 and controls motor 24. Valve 14 is disposed downstream of prime mover 12. While valve 14 is shown as directly mounted to prime mover 12, it is understood that valve 14 may be connected to prime mover 12 in any way suitable to allow fluid driven by prime mover 12 to flow through valve 14. Hose 16 fluidly connects valve 14 to dispenser 20. Flow meter 18 is located between valve 14 and dispenser 20.

Valve 14 and regulator 58 are controlled by controller 22. Motor 24 drives pump 26 to move the fluid downstream to dispenser 20. Pump 26 drives fluid through valve 14, hose 16, and dispenser 20, where the fluid may be dispensed directly onto a surface or combined with another material for application to a surface. Fluid pumping system 10 is configured to discharge the fluid through dispenser 20 at a set flow rate. Flow meter 18 reads the flow rate, the pressure, or both of the fluid flowing downstream through hose 16 between valve 14 and dispenser 20. Flow meter 18 provides the flow and pressure data to controller 22. While controller 22 is shown as communicating through a wired connection, it is understood that controller may communicate with any suitable method, including wirelessly.

As previously discussed, prime mover 12 initially builds a pressure of the fluid to a first pressure. Valve 14 can be left in a closed position to allow the fluid to deadhead against valve 14 to build the first pressure. Valve 14 then begins to cycle open and closed at a desired frequency, which causes the pressure at valve 14 to initially drop as the fluid fills through fluid pumping system 10. As valve 14 continues to cycle according to a fixed duty-cycle, prime mover 12 builds the pressure throughout fluid pumping system 10 back to a level suitable to dispense the fluid through dispenser 20 at the desired flow rate. Regulator 58 controls motor 24 to provide a specific fluid pressure downstream through fluid pumping system 10.

After regulator 58 has adjusted the pressure generated by motor 24 to achieve the desired flow rate, as sensed by flow meter 18, controller 22 begins to control the flow rate by varying the duty-cycle that valve 14 is cycling at. As such, the valve-open time is either increased or decreased to control the flow rate at dispenser 20. Where flow meter 18 senses that flow rate is below that required to maintain the desired flow rate at dispenser 20, controller 22 increases the valve-open time, which allows a greater volume of fluid to flow through valve 14 during a single cycle, thus increasing the downstream flow rate. Similarly, when the flow rate is greater than the flow rate required to maintain the desired flow rate at dispenser 20, controller 22 decreases the valve-open time to reduce the flow rate through dispenser 20.

Valve 14 cycles between open and closed according to a fixed frequency. While valve 14 is described as cycling according to a fixed frequency, it is understood that valve 14 may cycle at variable frequencies, such as when a variable flow rate is desired. While cycling, valve 14 travels between fully open and fully closed. The percent of the cycle that the valve is open is altered to determine the flow rate of the fluid passing through valve 14 and to dispenser 20. Cycling valve 14 between fully open and fully closed prevents abrasive fluid, such as polysulfide materials, from quickly wearing the sealing connection of valve 14.

Valve 14 also allows for efficient application of materials that include fillers, such as glass beads or air bubbles. Fillers may be added to materials, such as insulation, to reduce the weight of the material as applied. When materials that include fillers are applied through a valve that is opened a fixed amount and set, some of the fillers are destroyed due to passing through the restricted opening of the valve. Additionally, fillers flowing through traditional, fixed-orifice dispersing systems often cause the valve orifice and valve sealing surfaces to experience excessive wear due to the fillers flowing through the fixed orifice. Valve 14 cycles between fully open and fully closed, and thereby allows the material including fillers to pass through an unobstructed opening, which preserves the filler material.

Although the present invention has been described with reference to preferred embodiments, workers skilled in the art will recognize that changes may be made in form and detail without departing from the spirit and scope of the invention.

The invention claimed is:

1. A method of dispensing a fluid, the method comprising:
charging a fluid to a pressure with a prime mover having a motor and a pump, wherein a controller directs the prime mover to charge the fluid to the pressure;
cycling a downstream valve open and closed at a fixed frequency, wherein the valve is configured to cycle between fully opened and fully closed according to a variable duty-cycle;
sensing a valve-open time;

varying the valve-open time, by a controller, to maintain a desired flow rate at a downstream dispenser; and altering the pressure generated by the prime mover, by the controller, based on the sensed valve-open time, such that the pressure is increased as the valve-open time approaches 100 percent of the frequency, and the pressure is decreased as the valve-open time approaches zero percent of the frequency.

2. The method of claim 1, and further comprising:
sensing an in-stream data at a flow meter located downstream of the valve; and
communicating the in-stream data to the controller.

3. The method of claim 1, and further comprising:
mixing the fluid with a material downstream of the dispenser to create a plural-component material.

4. The method of claim 3, wherein the fluid is a catalyst in a plural component dispensing system.

5. The method of claim 1, and further comprising:
varying the frequency at which the valve cycles.

6. The method of claim 1, wherein the valve is a ball and a seat.

7. The method of claim 1, wherein the valve is selected from a group consisting of a pneumatically-actuated valve, a hydraulically-actuated valve, and an electrically-actuated valve.

8. The method of claim 1, wherein the fluid is a polysulfide material.

9. A fluid dispensing system comprising:
a prime mover for driving a fluid downstream, the prime mover comprising:
  a motor; and
  a pump;
a valve configured to cycle between fully open and fully closed according to a variable duty-cycle, the valve disposed downstream of the prime mover;
a dispenser disposed downstream of and fluidly connected to the valve;
a controller communicating with the prime mover and the valve; and
wherein the controller is configured to direct the prime mover to charge the fluid to a pressure, and to control the duty-cycle of the valve to provide a desired flow rate of the fluid at the dispenser; and wherein the controller is configured to control the prime mover to increase the pressure generated by the prime mover based on a valve-open time approaching 100 percent of the duty-cycle of the valve, and the controller is configured to control the prime mover to decrease the pressure generated by the prime mover based on the valve-open time approaching zero percent of the duty-cycle of the valve.

10. The fluid dispensing system of claim 9, wherein the valve comprises a ball and a seat.

11. The fluid dispensing system of claim 9, and further comprising:
a hose disposed between and fluidly connecting the dispenser and the valve.

12. The fluid dispensing system of claim 9, and further comprising:
a flow meter disposed between the valve and the dispenser and in communication with the controller; and
wherein the flow meter senses an in-stream data and communicates the in-stream data to the controller.

13. The fluid dispensing system of claim 9, wherein the valve is a pneumatically actuated valve.

14. The fluid dispensing system of claim 9, further comprising:
a regulator attached to the prime mover and communicating with the controller, the regulator controlling a pressure generated by the prime mover.

15. The fluid dispensing system of claim 9, wherein the valve is selected from a group consisting of an electrically-actuated valve and a hydraulically-actuated valve.

16. The fluid dispensing system of claim 9, wherein the valve cycles at a fixed frequency.

17. The fluid dispensing system of claim 9, wherein the valve cycles at a variable frequency.

18. The fluid dispensing system of claim 9, and further comprising:
a restrictive hose disposed between and connecting the prime mover and the valve.

19. The fluid dispensing system of claim 9, wherein a fluid being dispensed is a polysulfide material.

* * * * *